United States Patent
Ziegltrum

(10) Patent No.: US 11,612,973 B2
(45) Date of Patent: Mar. 28, 2023

(54) CREATING A DIGITAL TWIN IN A PROCESSING CENTRE

(71) Applicant: FRANZ HAIMER MASCHINENBAU KG, Hollenbach (DE)

(72) Inventor: Franz Ziegltrum, Hollenbach (DE)

(73) Assignee: FRANZ HAIMER MASCHINENBAU KG, Igenhausen (DE)

( * ) Notice: Subject to any disclaimer, the term of this patent is extended or adjusted under 35 U.S.C. 154(b) by 474 days.

(21) Appl. No.: 16/635,694

(22) PCT Filed: Aug. 7, 2018

(86) PCT No.: PCT/EP2018/071388
§ 371 (c)(1),
(2) Date: Jan. 31, 2020

(87) PCT Pub. No.: WO2019/030222
PCT Pub. Date: Feb. 14, 2019

(65) Prior Publication Data
US 2020/0282504 A1   Sep. 10, 2020

(30) Foreign Application Priority Data
Aug. 7, 2017 (DE) ...................... 10 2017 117 840.6

(51) Int. Cl.
*B23Q 17/24* (2006.01)
*B23Q 17/09* (2006.01)

(52) U.S. Cl.
CPC ....... *B23Q 17/249* (2013.01); *B23Q 17/0919* (2013.01)

(58) Field of Classification Search
CPC .................................................. B23Q 17/249
See application file for complete search history.

(56) References Cited

U.S. PATENT DOCUMENTS

| 2015/0028007 A1* | 1/2015 | Pluss ...................... B23K 26/40 219/121.68 |
| 2016/0016274 A1* | 1/2016 | Grau .................... B23Q 17/249 356/612 |

(Continued)

FOREIGN PATENT DOCUMENTS

| DE | 9017270 U1 | 3/1991 |
| DE | 19528376 A1 | 2/1997 |

(Continued)

OTHER PUBLICATIONS

International Search Report and Written Opinion of the International Search Authority issued in PCT/EP2018/071388, dated Nov. 20, 2018; ISA/EP.

*Primary Examiner* — Irfan Habib
(74) *Attorney, Agent, or Firm* — Harness, Dickey & Pierce, P.L.C.

(57) ABSTRACT

The invention relates to a processing centre (1) or cutting materials, consisting of a cutting machine (2a) and an adjusting device (5), wherein the adjusting device (5) has a positioning device (8), an illumination device (9, 9a) and an image sensor (11), wherein the positioning device (8) holds a tool unit (10) to be illuminated by the illumination device (9, 9a) in front of the image sensor (11) in such a way that the image sensor (11) is partially shaded by the tool unit (10), wherein the image sensor (11) has a greater maximum extension in at least one spatial coordinates direction than the tool unit (10) in the same spatial coordinates direction, and wherein the outline contour of the tool unit (10) is determined using the value for the extension of the shaded region.

20 Claims, 7 Drawing Sheets

(56) References Cited

U.S. PATENT DOCUMENTS

| | | | | |
|---|---|---|---|---|
| 2019/0070682 A1* | 3/2019 | Schwarzmann | ...... | B23Q 39/027 |
| 2019/0314947 A1* | 10/2019 | Liu | ................ | B23Q 17/2495 |
| 2019/0332086 A1* | 10/2019 | Aizawa | ................ | G05B 19/182 |
| 2020/0269334 A1* | 8/2020 | Frank | ................ | B23D 59/001 |
| 2020/0282504 A1* | 9/2020 | Ziegltrum | .......... | B23Q 17/2457 |

FOREIGN PATENT DOCUMENTS

| | | |
|---|---|---|
| DE | 102005026375 A1 | 12/2006 |
| JP | H0985584 A | 3/1997 |
| WO | WO-2015104945 A1 | 7/2015 |

\* cited by examiner

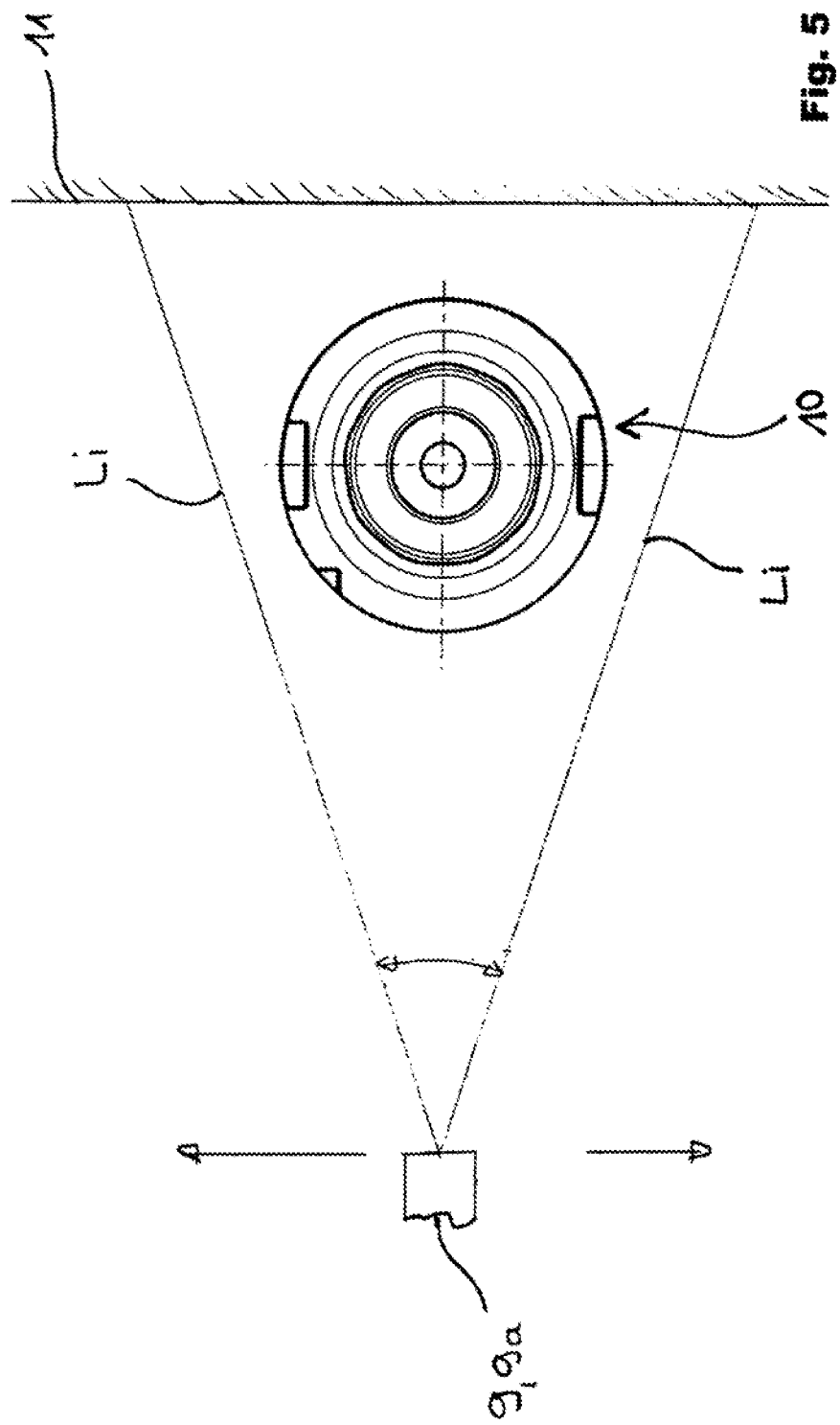

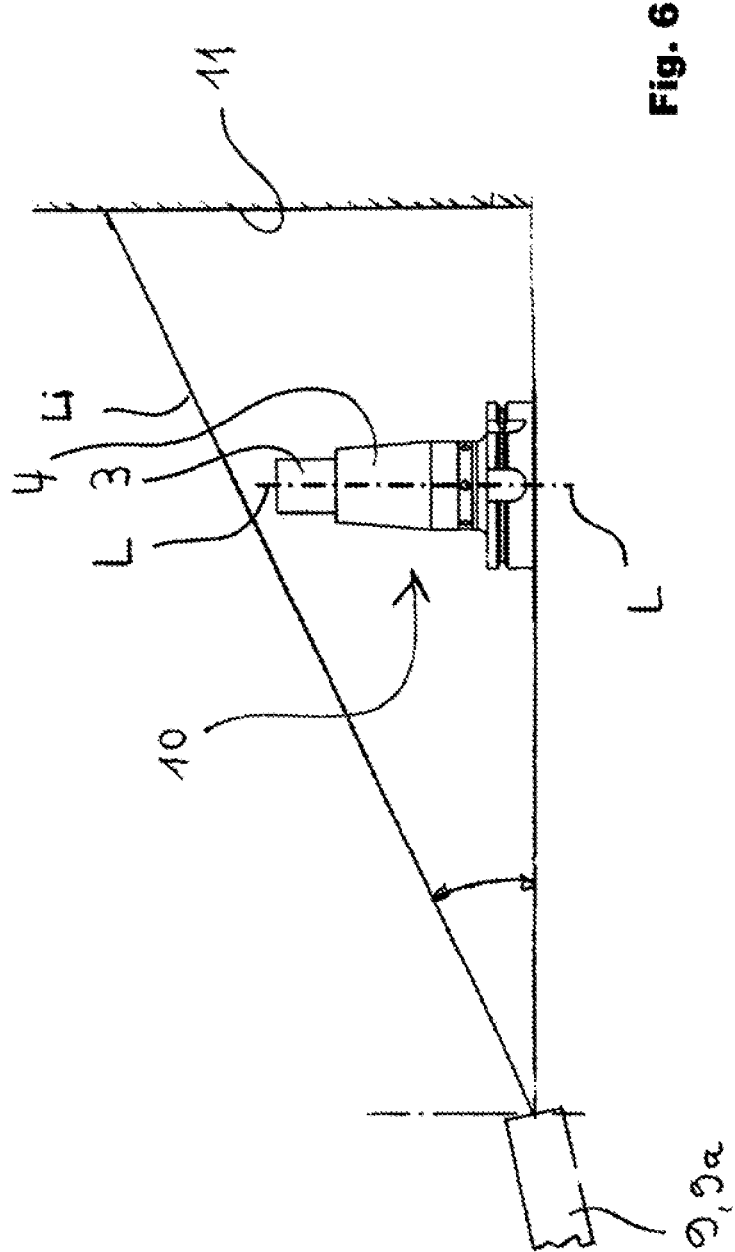

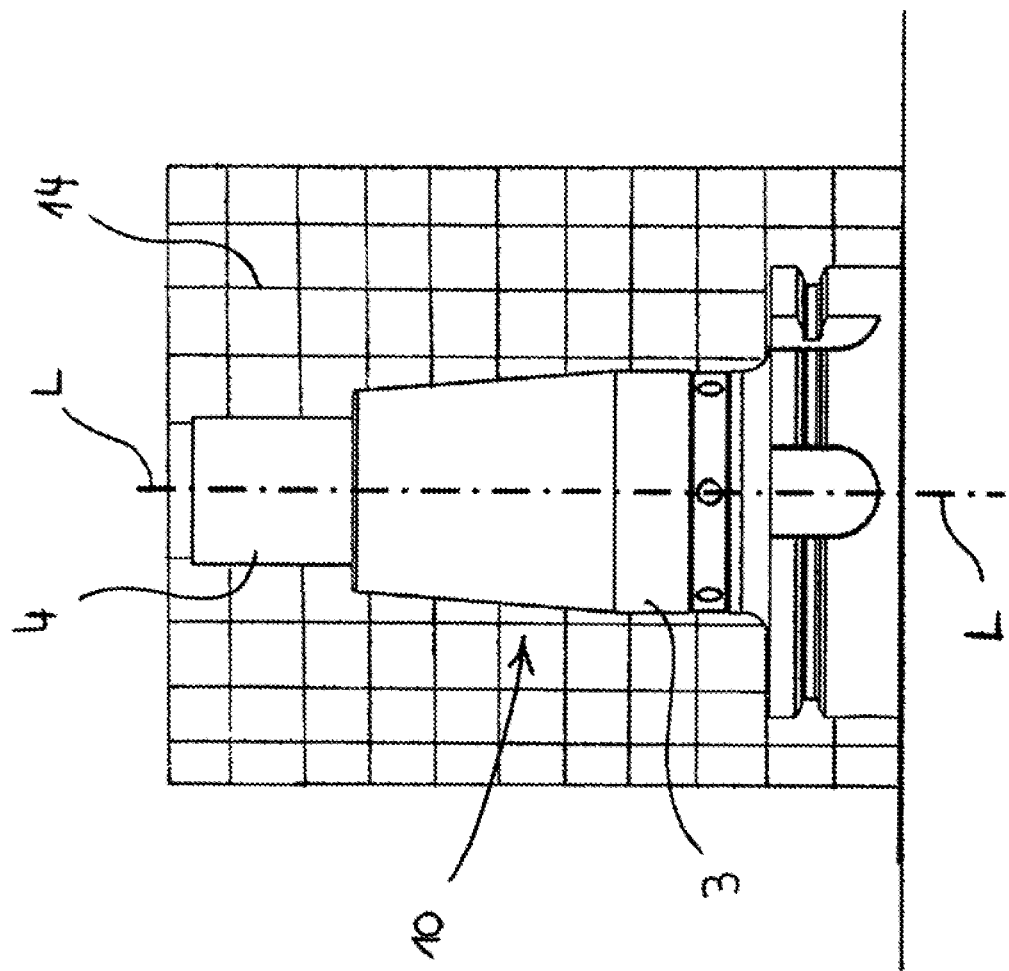

CREATING A DIGITAL TWIN IN A PROCESSING CENTRE

CROSS-REFERENCE TO RELATED APPLICATIONS

This application is a 371 U.S. National Phase of International Application No. PCT/EP2018/071388, filed on Aug. 7, 2018, which claims priority to German Application No. 10 2017 117 840.6, filed on Aug. 7, 2017. The entire disclosures of the above applications are incorporated herein by reference.

The invention relates to a machining center according to the preamble of claim 1, to a corresponding method and to a corresponding use.

TECHNICAL BACKGROUND

In the context of this application, tool units are initially also understood to mean individual tools, such as for instance milling cutters. For the most part and therefore preferably, the term tool unit is however understood to mean complete units consisting of a tool holder, a cutting tool built into the tool holder and any accessories.

What is Known as the Tool Preset

The position of the cutting edge of the tool has long been taken into consideration by machine tools.

For this purpose, the data of the tool units were previously defined either on paper in the form of a tooling sheet or digitally in the form of a parts list. The documents usually contain at least data in the form of the designation of the tool and the item numbers of its individual parts, as well as the target position dimensions of the cutting edges with the tolerance.

During tool assembly, the complete tools are assembled and measured based on these data, and adjusted if necessary.

Reference is made to what is known as the preset. The preset ensures that the cutting edges of the tool have the position dimensions that are acceptable for the planned machining.

The actual position dimensions of the cutting edges are transferred to the controller of the machine, manually or in the known electronic ways.

The controller of the cutting machine is then able to compensate position deviations that the cutting edges of the tool contain within a certain scope by adjusting the movement paths.

The position of the cutting edges is often measured optically using digital cameras.

Since a high degree of accuracy is required for measuring the cutting edges, this usually being in the range between 0.001 mm and 0.02 mm, the cameras have a very high resolution. This however entails only a small recording window. Current systems therefore only record an area of approximately 5 mm×5 mm to 10 mm×10 mm.

The corresponding camera is mounted at a defined distance from the axis of rotation of the tool and is able to be moved parallel to the axis of rotation of the tool in the direction of the Z axis and perpendicular to the axis of rotation of the tool in the direction of the Y axis. The camera has optics that are designed such that their focus lies exactly in that plane perpendicular to the viewing direction of the camera that contains the axis of rotation of the tool. The focusing area, that is to say the depth of field, comprises a small area in front of and behind the focal plane. Telecentric lenses are generally used.

The Collision Check for the Complete Tool Unit

In modern machining centers, however, taking into consideration the position of the cutting edge does not stop there.

Instead, collision monitoring is usually performed in modern machining centers. For this purpose, the entire machining process is simulated at least computationally and it is checked whether there are collisions between the tool unit and the workpiece or the surrounding components (machine table, clamping device, etc.).

The data regarding the position of the cutting edge are not sufficient for this purpose; instead, information is required as to the appearance of the enveloping contour of the respective tool unit that is responsible for whether the rotating tool unit (still) has the necessary clearance or accidentally collides with the workpiece at any point during the machining. A digital image of the complete tool, what is known as the "digital twin", is thus required.

The data about the enveloping contour are able to and have to be entered manually.

As an alternative, use is nowadays made of the data that the manufacturers of the tools or tool holders and accessories have recorded for their products and passed on to their customers, if this is the case—such data is by no means always available. However, the data are not uniform in terms of their format and they do not always have to be completely accurate. It has furthermore been found in practice that inaccuracies arise in the course of the assembly of for example the tool holder and the cutting tool, for both of which manufacturer-specific datasets regarding the enveloping contour have been provided. In the case of special tools, drawings are often not available from the manufacturer.

It is also often attempted to determine the geometry of a tool using a series of defined parameters, what are known as characteristics lists, for example in accordance with the DIN 4000 series of standards. However, this method may only be used to determine a limited number of characteristic properties of a tool, such as for example length and diameter. It is thus not possible to completely describe the outer contour. The corresponding data are also not always available, and often also available only to an incomplete extent.

In any case, the effort to create a digital twin of the complete tool is very high. Even in the case of just a medium-sized company, effort over several man-years is required to electronically store the tools in the inventory as a digital twin.

The Problem Underlying the Invention

The invention is based on the object of providing a device by way of which a digital twin of a tool unit is able to be produced efficiently.

The Solution According to the Invention

In order to solve this problem, what is proposed is a special machining center for cutting materials.

This machining center consists of a cutting machine and a setting device.

It is distinguished in that the setting device has a positioning apparatus, an illumination apparatus and an image sensor.

The positioning apparatus is designed such that it holds a tool unit to be illuminated by way of the illumination apparatus in position in front of the image sensor such that the image sensor is partially shaded by the tool unit.

According to the invention, the image sensor in this case has a greater maximum extent in at least one spatial coordinate direction than the tool unit in the same spatial coordinate direction. The enveloping contour of the tool unit is determined using the value for the extent of the shaded area.

The invention is based on the finding that the very high accuracy that is required for the tool preset is not necessary for producing a digital twin.

Within the scope of the tool preset, optical scanning of the cutting edges is required, this generally having to be accurate to within at least 5/1000 mm.

An accuracy that is worse in terms of dimensions is sufficient for the collision analysis. This is because the tool unit in any case has to maintain a distance of several millimeters from areas at risk of collision during operation in order to be able to safely rule out an impermissible collision—including under the influence of operational vibrations. In addition to the collision check, other simulations in the CAD/CAM may expediently use the tool model. Physical twins may be checked against the digital template using what is known as the ViaFit function, for example. The ViaFit function indicates a higher accuracy than that required in this invention.

According to the invention, there is provision to determine the extent or length of the shaded area with only an accuracy of at least 0.5 mm, in some cases of at least 0.25 mm and ideally of at least 0.1 mm. Therefore, measuring apparatuses that record a large image area with a relatively low resolution may be used to implement the invention.

It is thereby possible to image the complete tool in just a few steps or, ideally, even with a single shot. This means that even a relatively large inventory of tool units is able to be digitized quickly and easily.

The machining center according to the invention is particularly suitable for creating a digital twin of tool units that consist of a tool chuck and a cutting tool mounted therein. It is therefore largely used for this purpose. In principle, however, it may also be used to measure only the tool chuck and/or only the cutting tool such that a digital twin is generated therefrom.

The term tool unit accordingly has a dual meaning in the present context.

In its narrower sense, it denotes the assembly of a tool chuck with a cutting tool mounted therein. In its broader sense, it also denotes a mere cutting tool—even if this broad meaning is clearly not preferred.

The cutting machine and the setting device, which belong to the machining center, are preferably linked directly to one another or are even physically part of a single machine with a common base.

In other cases, it is however sufficient for the implementation of the invention if the cutting machine and the setting device are merely two separate devices that cooperate with one another.

A positioning apparatus is generally understood to mean a holding apparatus that holds or at least locally grasps the tool unit to be measured in a predetermined position in a frictional and/or form-fitting manner and is then able to deal with the different diameters of the tool units to be measured.

In simpler cases, however, a setting-down plane may already be such a positioning apparatus, even if this is clearly not preferred.

The extent of the shaded area is understood to mean its length or surface area. Where—as will be explained in more detail shortly—a line sensor is used as image sensor, in a first embodiment, the extent of the shaded area is the length over which the line sensor is shaded and that lies between two illuminated sections of the line sensor. In a second, preferred embodiment, only half of the tool unit is illuminated, that is to say orthogonally from its axis of rotation to its outer edge. In this case, the shaded area extends orthogonally from the axis of rotation to the illuminated area of the sensor.

Where—as will be explained in more detail shortly—a plate sensor is used as image sensor, the extent of the shaded area represents the surface area of the shaded area that lies orthogonal to the axis of rotation of the tool unit, at least between two illuminated areas positioned to the side of the tool unit to be measured, or lies between the axis of rotation and an illuminated area and that at the same time lies in the direction of the axis of rotation between an illuminated area positioned above the tool unit to be measured and either an area that is also illuminated and is positioned below the tool unit to be measured or the floor space on which the tool unit to be measured rests.

The illumination apparatus is in this case an apparatus that emits radiation in the visible and/or invisible frequency range, which is able to be detected by an image sensor, that is to say triggers an electrical signal there.

The image sensor is in this case an apparatus that derives its light sensitivity from a crowd or matrix of individual pixels. It is able to be established for these pixels, preferably individually or combined into clusters (for example clusters of four), whether they are illuminated or not illuminated and/or whether they are illuminated more or less than a certain limit intensity. It is thereby able to be established, pixel by pixel or in clusters, whether or not the pixel in question or the cluster in question is still in the shadow cast by the tool unit to be measured.

Said extent of the shaded area is thereby able to be determined.

PREFERRED DEVELOPMENTS OF THE INVENTION

The image sensor is ideally a plate sensor that has a greater maximum extent in two mutually perpendicular spatial coordinate directions than the tool unit in the same spatial coordinate directions. A format of more than 400 mm×200 mm is ideal.

If for example the orthogonal distance between the tool unit to be measured and the plate sensor is defined as the X axis, then such a plate sensor has greater maximum extents along the Y axis and along the Z axis than the tool unit along said axes.

Such a plate sensor has the advantage that it is able to record the size of the entire surface area that is shaded by the tool unit to be examined in one go.

Such a plate sensor would be unusable for a photorealistic display, since the photographic image supplied thereby would be arbitrarily out of focus. In the case of an arbitrarily out of focus photographic image, the shadow that is cast is also very imprecise, which makes implementation particularly problematic. To determinate a shadow that is cast with one of the relatively generous tolerances given above, however, a plate sensor with a correspondingly large surface area is able to be formed without problems.

Where, for example for reasons of cost, no distinct special sensors, such as said plate sensor, are required, it is expedient to design the image sensor as a line sensor that extends in a first spatial coordinate direction. In the simplest case, one of the line sensors previously installed in fax machines serves as an image sensor.

In this first spatial coordinate direction, the line sensor has a greater maximum extent than the tool unit in the same spatial coordinate direction. The extent of the line sensor in the direction along the first spatial coordinate direction is preferably greater by at least a factor of 20 than its extent along the second spatial coordinate direction. Such a line sensor may then contain only a single line with pixels or clusters of pixels connected in the same way or several lines.

If for example the orthogonal distance between the tool unit to be measured and the line sensor is again for illustrative purposes also defined as the X axis here, then such a line sensor has for example a greater maximum extent in the direction along the Y axis than the tool unit has along said axis.

The measurement then takes place in several successive steps. Measurements are performed progressively along a second spatial coordinate direction that lies perpendicular to said first spatial coordinate direction of the line sensor. To stay with the example started above, this may be the Z axis. For this purpose, at least the line sensor and the light source or else the workpiece are moved in the direction of the second spatial coordinate direction after each measurement.

A realistic image of the shadow that is cast by the tool unit to be measured, consisting of several individual parts, is thereby obtained.

The crucial point is that a line sensor is able to be built so as to be very large, without generating a dataset that is problematic in terms of its scope in each measuring step. In such an application case, it is more efficient if initially only datasets that are restricted in terms of their scope are generated, which datasets may already be evaluated when the line sensor moves to its next position. It is thereby possible to work synchronously, which is faster.

The illumination apparatus is ideally designed such that it emits a parallel, better still a polarized and preferably a coherent light.

In the simplest case, the illumination apparatus is thus a lamp whose light beam is guided through a slotted aperture and that therefore only illuminates a bar-shaped area.

However, the illumination apparatus preferably comprises a lamp whose light beam is guided through a polarization filter and possibly additionally through an aperture before it is fed to the tool unit to be measured. The use of polarized light means that the light/dark boundary is sharper. It is thereby possible to more precisely determine where the shadow that is cast by the tool unit to be measured begins and ends.

The illumination apparatus is ideally such that it emits coherent light. For this purpose, the illumination apparatus is a single laser or, even better still, a linear laser array. Due to the fact that coherent light does not scatter, the light/dark boundary is able to be determined here with extremely good precision.

It is particularly expedient according to the invention to use a laser array with a distance of at least 0.5 mm, better still at least 0.25 mm or even better still 0.1 mm between immediately adjacent laser beams. Such a configuration has the advantage that the image sensor likewise also only has to have a correspondingly small number of pixels, which results in an extremely fast-working system.

This is already highly advantageous when using a line sensor, but it is particularly beneficial when a two-dimensional laser array is used.

In order to achieve a relatively precise measurement in those cases in which there is no one-hundred-percent sharp light/dark boundary but rather a more or less pronounced twilight area between the light and the dark areas, the device according to the invention is designed such that it evaluates the signal strength that a single pixel or a cluster of pixels delivers under the incidence of light. Ideally, a pixel is deemed to be darkened if its signal strength is at most 75% of a pixel that has been recognized as being 100% illuminated.

It is particularly expedient if the positioning apparatus is designed such that it sets the tool unit in rotation during the measurement. The rotational speed is in this case preferably high enough that a shadow is cast, which is able to be recognized as a shadow that is cast with stationary lines. Purely by way of example, this is the case when, due to the rotation, all of the pixels that lie at least temporarily in the area of the shadow that is cast deliver only an average signal strength that is far enough from the signal strength of a 100%-illuminated pixel that the pixel in question is recognized as shaded.

It is particularly expedient if the device according to the invention has a measuring chamber that is able to be darkened substantially completely. It is thereby possible to work undisturbed by surrounding stray light.

The measuring chamber ideally has light-absorbing inner surfaces, such that light reflections deflected by the tool unit to be measured do not falsify the measurement result, that is to say generate no or no significant signal at the image sensor.

Another Problem in Connection with the Invention

Not least for small series, the problem arises of specifying a solution that as far as possible uses available components in order to perform the measurement according to the invention.

The Alternative Solution According to the Invention

This other problem in connection with the inventive approach is solved by a method having the preamble of the other main claim and by a correspondingly configured device and use, both of which are likewise claimed.

What is thus proposed is a method for creating a digital twin of a tool unit consisting of a tool holder and a tool insert, which method is distinguished in that the preferably rotating tool unit is positioned in front of a measuring grid.

A digital image of the measuring grid with the tool unit in front of it is then recorded.

The length of the measuring lines crossing in two spatial directions—which are usually orthogonal—is then determined.

For measuring lines whose length is shorter than that of an undisturbed continuous measuring line in the same direction, the position (away from the outer edge or from the nearest crossing point) at which the measuring line ends is calculated. The enveloping contour and thus the image of the tool unit are preferably calculated from the end points thereby obtained by interpolation between immediately adjacent end points.

The major advantage of this method is that the machining center or its setting device are able to be set up using commercially available image sensors, such that the customization work to be done essentially needs to be performed on the software side, for which reason this system is particularly suitable not least for small series.

Other

Further design options, modes of operation and advantages of the invention become apparent from the following description of various exemplary embodiments with reference to the figures.

It should also be noted that protection for the use of an image sensor and a preferably collimated light source or a single laser or a multi-lamp laser bar for determining the shaded area or contour caused by a rotating tool unit is also claimed.

LIST OF FIGURES

FIG. 5 shows a variant in which measurements are performed using a fanned-out light beam.

FIG. 6 shows a variant in which measurements are performed using a single laser beam.

FIG. 7 shows a completely alternative type of measurement using a conventional image sensor and a measuring grid.

EXEMPLARY EMBODIMENTS

Principle of the Arrangement According to the Invention

Figure 1:
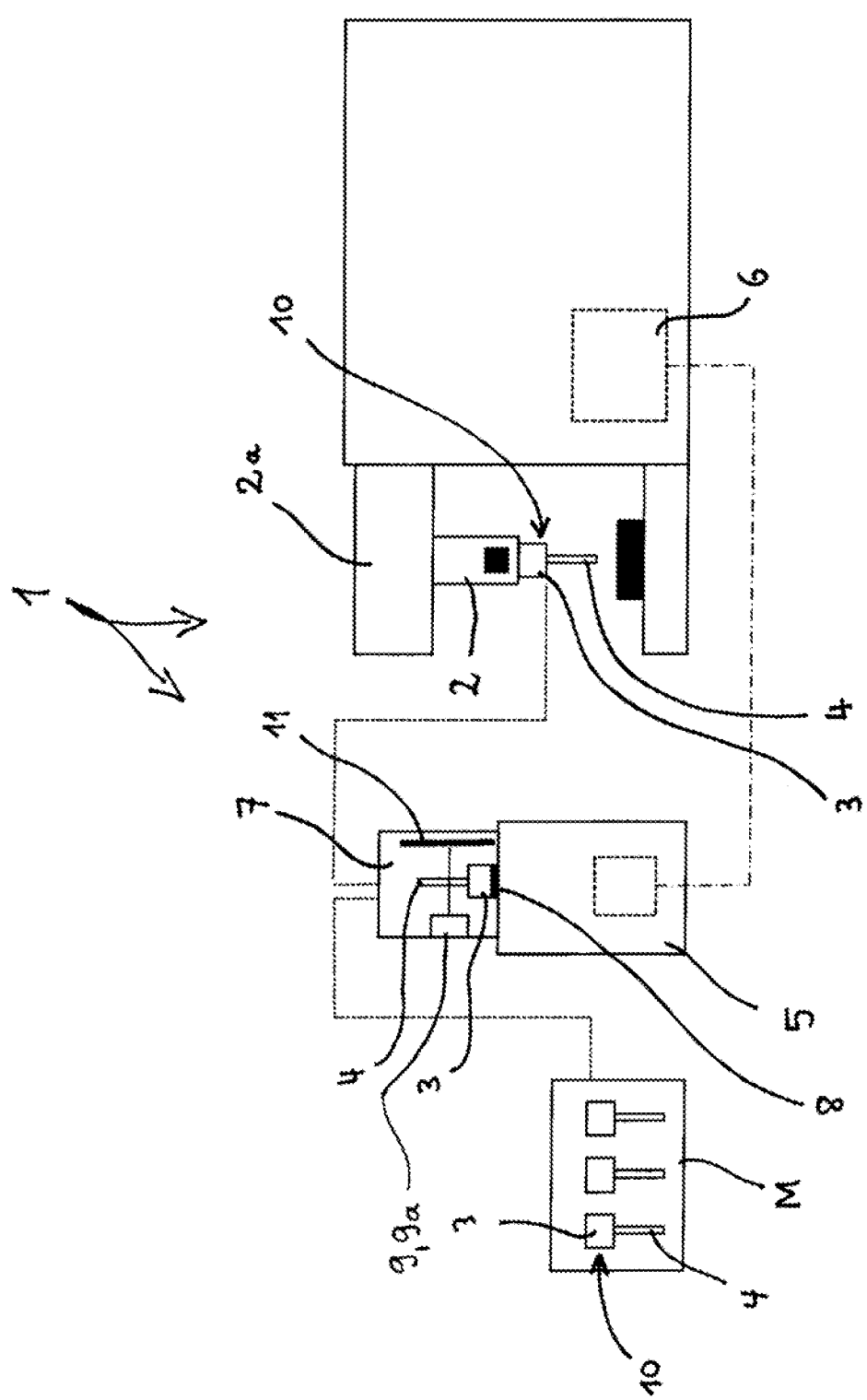
FIG. 1 shows a general overview of a machining system according to the invention.

FIG. 1 shows a first exemplary embodiment of a machining center 1 according to the invention.

The machining center 1 in this case consists of a cutting machine 2a with at least one work spindle 2, preferably in the form of a multi-axis milling machine. A cutting tool 4, preferably in the form of a milling cutter, is coupled to said work spindle 2.

The cutting tool 4 is usually coupled with the interposition of a tool chuck 3. The tool chuck 3 holds the cutting tool fixedly in terms of torque, clamped in ready for work. Said tool chuck for its part is coupled fixedly in terms of torque to the work spindle of the machine tool and serves as a standardized interface between the cutting tool and the individual work spindle.

A setting device 5 is linked to the cutting machine 2a and is preferably equipped with a darkened measuring chamber 7.

A tool magazine M is often also likewise linked to the other system components. This is also shown in FIG. 1.

The positioning apparatus 8 is located in the measuring chamber 7. In the simplest case, this is a setting-down plane, which in many cases will have a positively acting positioning aid. The latter is designed such that it ensures that the axis about which the tool unit to be measured in the cutting machine is to rotate always lies at the same location.

The measurement according to the invention is performed on the setting device 5 or in its measuring chamber 7. This measurement delivers the geometric data of an enveloping body that completely accommodates the rotating tool unit 10, that is to say represents what is called an image of the rotating tool unit, which is also called a digital twin. The image of the rotating tool unit corresponds substantially, or with a tolerance of 0.5 mm, preferably 0.25 mm, particularly preferably 0.1 mm, to the actual shape, that is to say what is called the real image, of the rotating tool unit.

The setting device 5 preferably transmits the data obtained in this way to the controller 6 of the cutting machine.

This uses the data delivered by the setting device 5 in order to perform a computer simulation with the aim of verifying that the tool unit, on its programmed path that it is to take on the cutting machine, does not strike anywhere unplanned and is thereby damaged or causes damage itself.

First Variant of the Actual Measuring Arrangement

Figure 2:
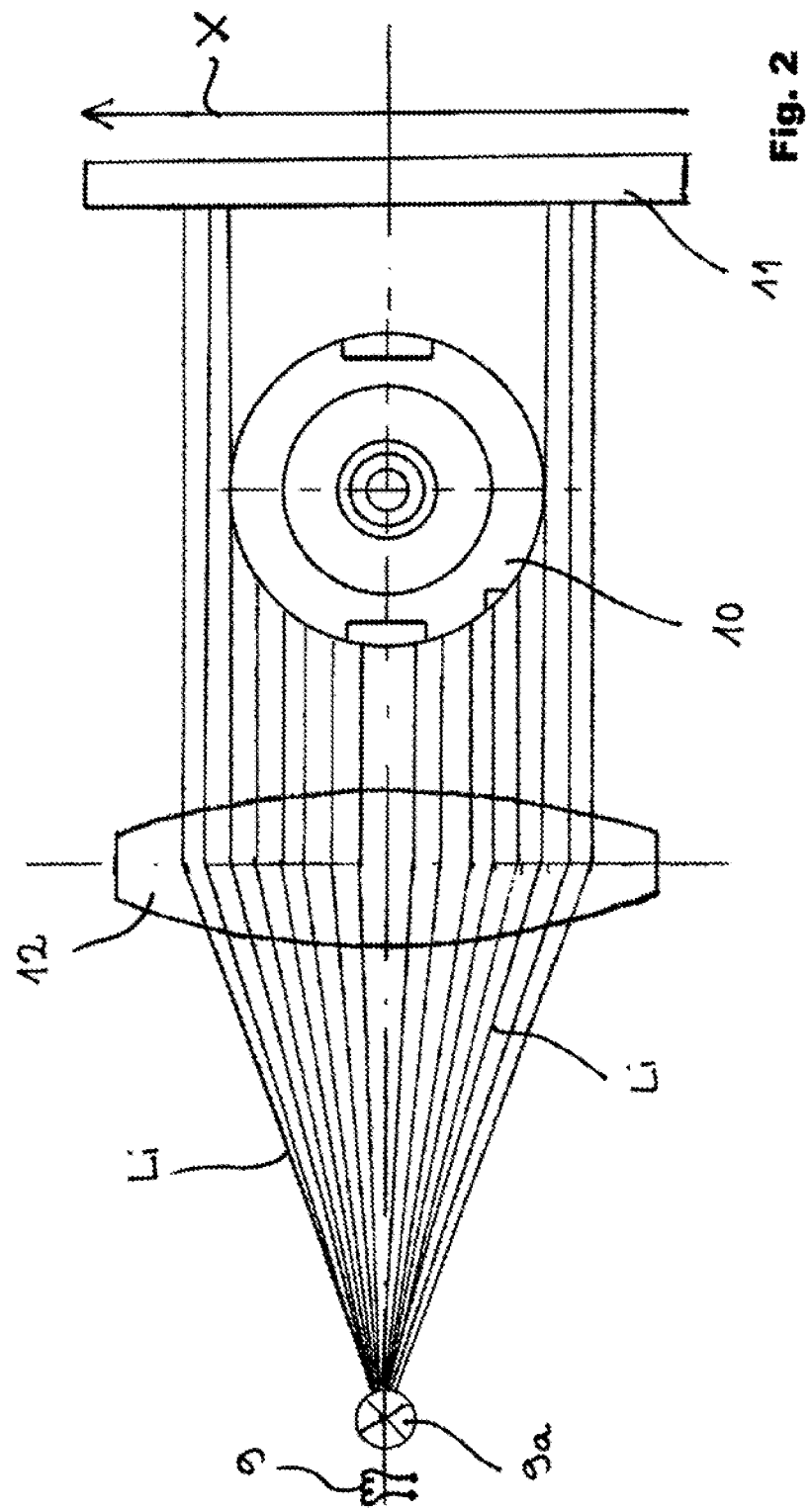
FIG. 2 shows a recording device according to the invention, which works with collimated light and a line sensor.

FIG. 2 shows a basic first variant of the measuring arrangement used for the measurement according to the invention.

A light source 9 that usually generates parallel-oriented light beams is used.

For this purpose, a pinhole aperture 9a arranged behind the actual lamp in the beam direction is preferably used. This serves as a point light source.

The light rays Li emitted thereby are dispersed by a scattering lens 12 in such a way that they run substantially parallel, that is to say their focal point is at infinity or substantially at infinity.

According to the invention, what is known as a collimator is used.

In order to keep the "twilight area" that forms the light/dark boundary on the image sensor as small as possible, it may be a sensible option to additionally use a polarization filter, which is not shown here in the figure.

A slotted aperture, likewise not shown here, may optionally be provided, this ensuring that only a light curtain is output overall, the extent of said light curtain being such that its cross-sectional surface area corresponds (completely or at least substantially) to the surface area of the image sensor.

An image sensor 11, which is designed here as a line sensor in the sense defined at the outset, is arranged on the other side of the tool unit 10 to be measured and that is preferably set in rotation during the measurement. It should be noted that, in the present example, this line sensor has a greater maximum extent on both sides in a spatial coordinate direction (here specifically that of the X spatial coordinate direction) than the tool unit 10 in the same spatial coordinate direction.

It is likewise able to be seen clearly that the tool unit 10 to be measured casts a shadow in the parallel beam path that is preferably used, which shadow is an image of the rotating tool unit 10.

Figure 3:
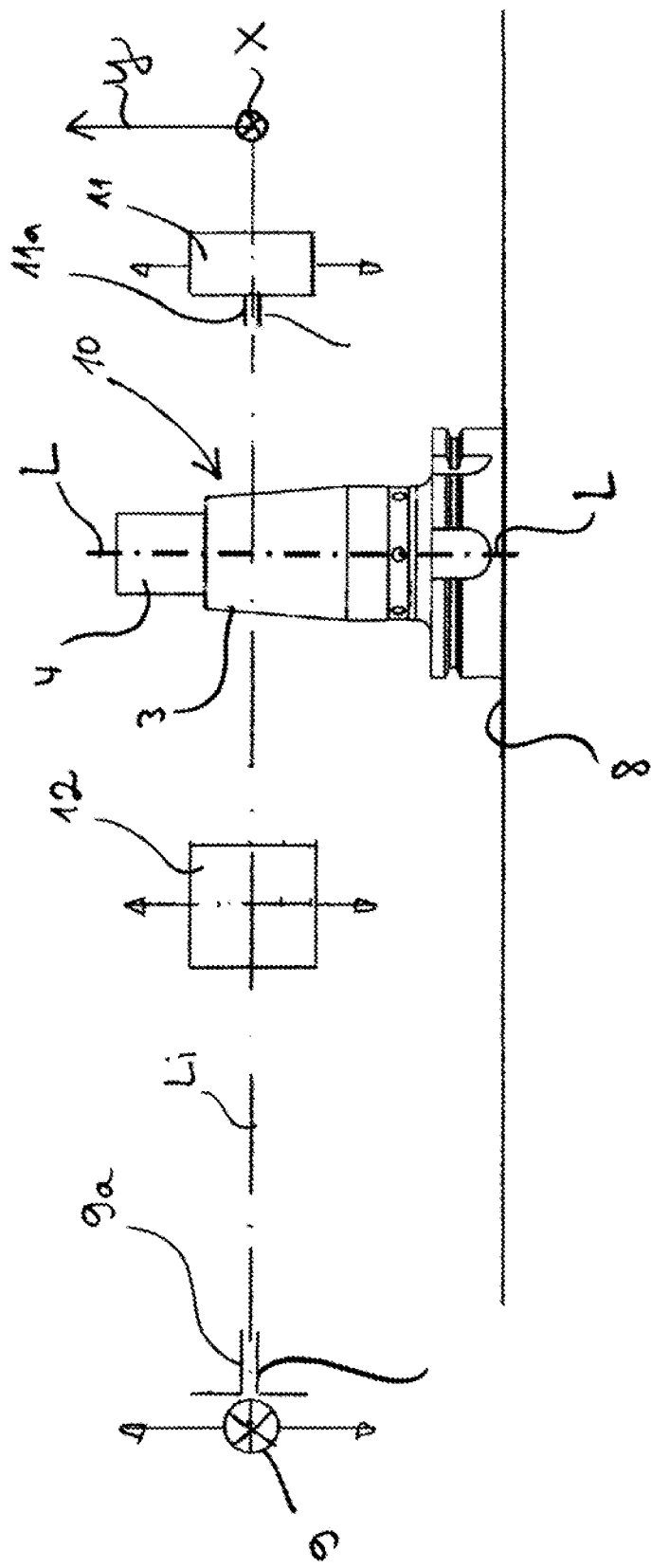
FIG. 3 shows a side view of FIG. 2.

FIG. 3 shows the arrangement according to FIG. 2 in a side view. In this exemplary embodiment, the measurement is performed step by step in the direction of the subsequent operating axis of rotation L of the tool unit 10. For this purpose, the light source 9, the scattering lens 12 and the image sensor 11 are moved parallel to the operating axis of rotation. For example, the shadow that is cast is then determined every 0.1 mm. For this purpose, travel may be stopped briefly parallel to the operating longitudinal axis, but a snapshot may also be taken "while moving". This procedure is repeated again and again until a complete image of the rotating tool unit has been created.

Ideally, the light source 9, the scattering lens 12 and the image sensor 11 are arranged on a jointly movable carriage or frame.

As an alternative, the device according to the invention may also be designed such that instead of the light source 9, the scattering lens 12 and the image sensor 11, only the tool unit 10 to be measured is moved in the direction of its operating axis of rotation. For this purpose, the positioning apparatus 8 may be designed as a motor-operated lifting table.

It is noteworthy that the line sensor may alternatively have a greater maximum extent only on one side in a spatial coordinate direction (here specifically that of the X spatial coordinate direction) than the tool unit 10 in the same spatial coordinate direction—which is not illustrated here in the figure. The tool unit to be measured is then only measured in half, from its outer edge to its operating axis of rotation. This not only allows an image sensor with a smaller surface area, but also reduces the amount of data processing, thus speeding up the work process.

It is likewise noteworthy that, instead of the conventional light source, a bar with a plurality of laser beams arranged next to one another and emerging parallel to one another is preferably used. Laser beams provide coherent light. This has the enormous advantage that practically no "twilight area" occurs between the light/dark boundary. Measurements are therefore able to be performed very precisely using simple means.

In this case, the bar may be supplied by a number of laser diodes lying next to one another on said bar, for example in accordance with the template in patent EP 0 486 175.

However, it is preferably supplied by a single, mostly central laser source. Its light beam is split several times by a beam splitter. It is then guided via optical conductors, usually in the form of glass fibers, to the individual outlet openings in said beam.

In this laser embodiment, the number and the distance of the individual laser sources or laser outlet openings and the number and the distance of the individual pixels or pixel clusters responsible for a laser beam are matched to one another. They then usually correspond to one another.

Second Variant of the Actual Measuring Arrangement

The function and structure of this second variant, shown in FIG. 4, correspond to that of the first variant—with the exception of the differences or options described explicitly below.

What has been described for the first variant, including all conceivable modifications, thus also applies here.

The difference is that, in this case, measurements are not performed step by step in the direction along the operating axis of rotation L of the tool unit 10 to be measured, but rather perpendicular thereto, that is to say the greatest length of the line sensor is aligned parallel to the operating axis of rotation L.

This makes it very easy to measure only half of the tool unit to be measured, from its outer edge to its operating axis of rotation, and thus to realize the advantages specified above.

Figure 4:
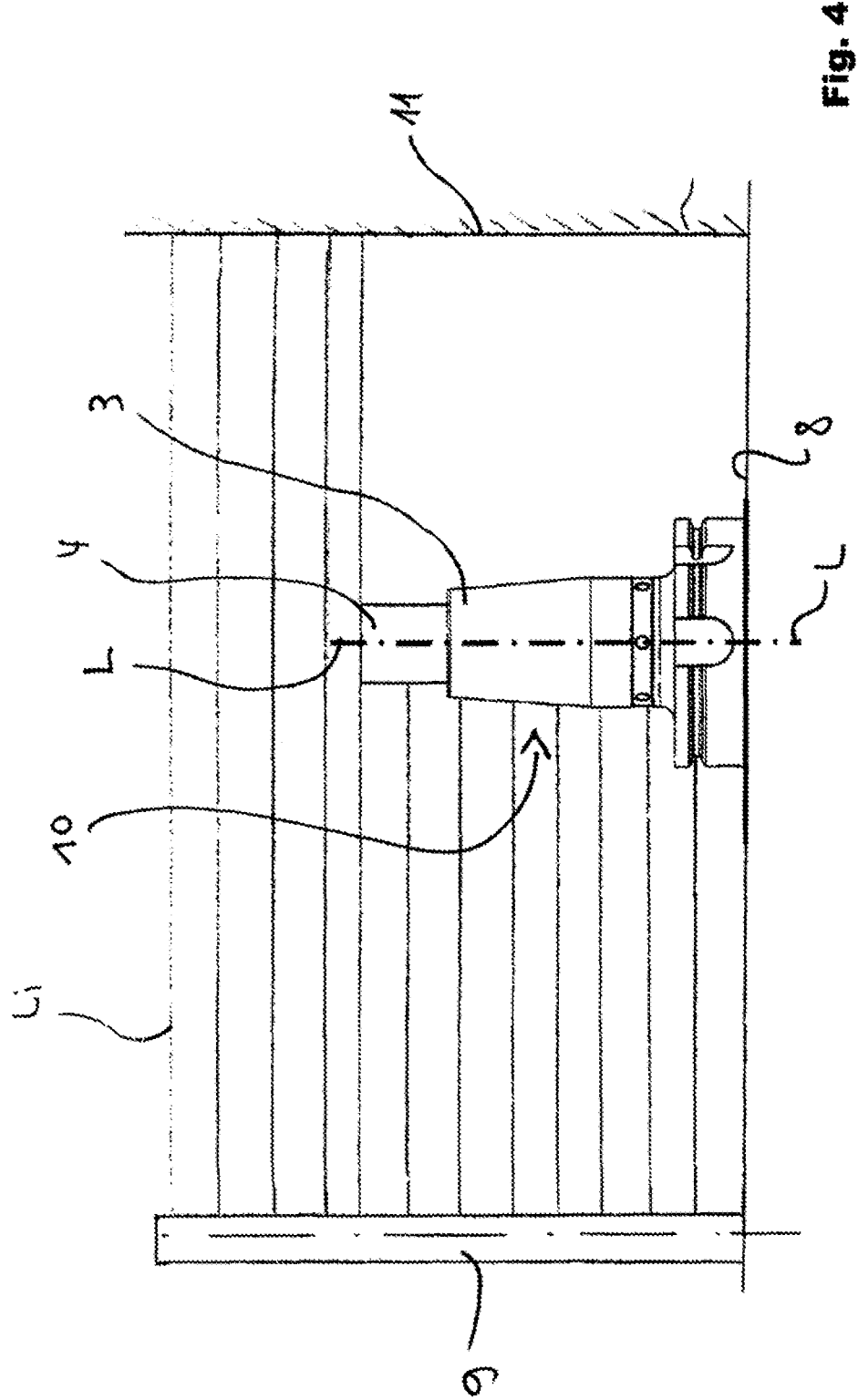
FIG. 4 shows a variant of FIG. 2, in which however measurements are not performed step by step in the direction along the operating axis of rotation of the tool unit, but rather progressively step by step parallel to the operating axis of rotation of the tool unit.

A further option, which may also be used in the first variant, is illustrated in FIG. 4: Instead of a conventional lamp with a downstream collimator, a diode or laser bar is used to form a crowd of light beams arranged in a line, these being formed in the manner of a flat light curtain.

Third Variant of the Actual Measuring Arrangement

FIG. 5 shows a further variant of the measuring arrangement according to the invention.

Instead of a light curtain consisting of collimated light, a fanned-out light beam is preferably used here.

If speed is important, such an inherently optically fanned-out light beam is recommended. The light beam may be optically fanned out in such a way as to give for example a triangular, increasingly widening light beam, as shown in FIG. 5.

An image sensor, for example a line sensor as described above, is again mounted behind the tool unit to be measured.

It is able to be seen clearly that the fanned-out light beam preferably exposes the entire linear image sensor at once. The fanning out of the light beam however results in a kind of parallax, which is also able to be seen clearly in FIG. 5—the shadow that is cast appears to be wider than justified by the size of the tool unit to be measured. However, the parallax error is easily able to be calculated mathematically and thereby corrected.

In this embodiment, it is particularly expedient if a laser whose light beam is subsequently fanned out, extensively or into individual sub-beams, serves as light source. This is because, despite the fanning out, the light naturally remains coherent (when fanning out into individual sub-beams) or at least its very precise fan is present (with extensive, as it were "blurred" fanning out), resulting in a good detectable light/dark boundary.

The light fan may be aligned horizontally and be able to be moved vertically or vice versa.

If a line sensor of the type described above is used, it is moved linearly in synchronism with the light fan, as likewise already described above.

Fourth Variant of the Actual Measuring Arrangement

As an alternative, instead of the fanning out, a single at least substantially straight light or laser beam may also be used, this being deflected for example step by step via a pivoting mechanism or via optics such as a discrete mirror or an electrically controllable micromirror matrix, in the manner shown in FIG. 6.

The deflection in each case takes place in such a way that it impinges or would have to impinge on the image sensor if the tool unit to be measured were not in the way.

In this case too, the silhouette of the tool unit to be measured may easily be determined with mathematical correction.

Fifth Variant of the Actual Measuring Arrangement

FIG. 7 shows a further, conceptually fundamentally different variant of the measuring arrangement according to the invention.

This is a measuring arrangement that uses a special method for creating a digital twin of a tool unit 10 consisting of a tool holder or chuck 3 and a tool 4, as described at the outset.

The measuring grid 14, which consists of orthogonally crossing lines, and the tool unit arranged in front of it are able to be seen clearly.

The work here is usually performed using a conventional image sensor, as is used for digital cameras. The image sensor is arranged on the diametrically opposite side of the tool unit to be measured in relation to the plane containing the measuring grid.

The image sensor, which cannot be seen in FIG. 7, is designed such that it records a digital image by way of which the length of the individual measuring lines is able to be determined in the horizontal and vertical direction. Completely vertical or horizontal continuous measuring lines are ignored. The measuring lines that are not completely continuous, because they are partially covered by the tool unit to be measured, are determined.

The distance from the edge of the measuring grid at which the respective measuring line ends is then for example determined. The respective end point corresponds to a point on the enveloping contour of the tool unit that preferably rotates during the measurement. If a linear or higher-order interpolation is then for example performed between the respectively adjacent end points, then the image that essentially corresponds to the enveloping contour of the tool unit is thereby obtained.

Options for all Variants

In general, it should be noted that the usable cutting edge areas of the tool must be disregarded for any collision analysis. This is because the cutting edge areas of the tool are allowed to dip into the workpiece without a collision taking place.

In order to exclude the usable cutting edge areas, the option exists to adopt the information about the position of the usable cutting edge areas from the tool preset and the measurement carried out in the process, and then to accordingly computationally trim the image generated according to the invention.

As an alternative, it is possible to color-code the cutting edge areas on the real tool and then to automatically recognize the colored areas. Such color-coding may be carried out for example using a spray made from UV luminescent paint, which only exhibits a recognizable light reflection under UV light, but otherwise behaves transparently.

A correspondingly emitting light source and a further sensor positioned on the side of the light source are then used, which sensor is able to recognize the surface area indicated by the UV luminescent paint such that said surface area is able to be taken into consideration.

As an alternative, manual marking may be performed on the digital image, or, which is often simpler, an aperture may be set before the recording according to the invention is performed. This aperture shades the entire usable cutting edge area and leaves a noticeable shadow pattern on the image sensor. This may easily be recognized as an area that is not to be taken into consideration for determining the collision-relevant enveloping contour.

Further Functions

If the tool units, tools or tool holders that are to be measured are appropriately marked, then they are able to be recognized automatically. What is known as a data matrix code, a bar code, other machine-readable tags and electromagnetic data carriers such as for example RFID chips are conceivable here. An EEPROM or flash memory or the like is advantageously used on the RFID chip. Additional reading units, such as for example read/write heads for RFID chips or scanners for bar codes, may under some circumstances be necessary for this purpose.

The newly created digital twins of a tool, of a tool holder or of a tool unit may be compared with existing datasets and thereby identified.

If the individual components of a tool unit are identified, a parts list for the entire tool unit may be created from the data, possibly with the addition of assembly instructions. Geometric data may also be stored together with the parts list, for example the total length of the tool or of the tool unit.

On the basis of the digital twins of the tool units or of the individual tools or tool holders, alternative or similar tools that are already used for other machining cases may be determined. It is thus easily possible to determine and suggest an alternative tool unit to be used if a potential collision or, in any case, an excessively small clearance is established.

It is thereby also possible to minimize the tool inventory if necessary, since several similar tools may then be replaced by a common design.

The method according to the invention digitizes the existing physical tool units or tools and tool holders quickly and easily.

It is therefore easy to generate an electronic database including individual components.

LIST OF REFERENCE SIGNS 1 machining center
2 work spindle
2a cutting machine
3 chuck or tool holder
4 cutting tool
5 setting device
6 controller of the cutting machine
7 darkened measuring chamber
8 positioning apparatus
9 light source
9a pinhole or slotted aperture (lamp side)
10 tool unit to be measured
11 image sensor
11a aperture or slotted aperture (image sensor side)
12 scattering lens
13 not used
14 measuring grid
M magazine of the tool changer or tool magazine
Li light beam or light beam path
L operating axis of rotation of the tool unit

The invention claimed is:

1. A machining center for cutting materials, consisting of a cutting machine and a setting device, wherein the setting device has a positioning apparatus, an illumination apparatus and an image sensor, wherein the positioning apparatus holds a tool unit to be illuminated by way of the illumination apparatus in front of the image sensor such that the image sensor is partially shaded by the tool unit, wherein the image sensor has a greater maximum extent in at least one spatial coordinate direction than the tool unit in the same spatial coordinate direction, and in that the enveloping contour of the tool unit is determined using the value for the extent of the shaded area and the cutting edge areas of the tool are disregarded to determine a collision-relevant envelope contour from the envelope contour.

2. The machining center as claimed in claim 1, wherein the image sensor has a greater maximum extent in two mutually perpendicular spatial coordinate directions than the tool unit in the same spatial coordinate directions.

3. The machining center as claimed in claim 1, wherein the image sensor is a line sensor that extends in a first spatial coordinate direction and progressively measures in several successive steps along a second spatial coordinate direction perpendicular thereto, wherein the extent of the line sensor in the direction along the first spatial coordinate direction is greater by at least a factor of 20 than along the second spatial coordinate direction.

4. The machining center as claimed in claim 1, wherein at least the line sensor and the light source move in the direction of the second spatial coordinate direction after each measurement.

5. The machining center as claimed in claim 1, wherein the workpiece moves in the direction of the second spatial coordinate direction after each measurement.

6. The machining center as claimed in claim 1, wherein the illumination apparatus emits parallel, better still polarized and preferably coherent light.

7. The machining center as claimed in claim 1, wherein the light beam(s) of the illumination apparatus are not focused on the tool unit.

8. The machining center as claimed in claim 1, wherein the signal strength that a single pixel delivers under the incidence of light is evaluated, and a pixel is deemed to be darkened if its signal strength exceeds a certain proportion of a pixel that is considered to be detected as 100% illuminated, preferably 75%.

9. The machining center as claimed in claim 1, wherein the positioning apparatus is designed such that the tool unit is able to be set in rotation during the measurement.

10. The machining center as claimed in claim 1, wherein the machining center has a measuring chamber that is able to be darkened substantially completely and that preferably has light-absorbing inner surfaces.

11. The machining center as claimed in claim 1, wherein the rotating tool unit is positioned in front of a measuring grid and in that a digital image of the measuring grid with the tool unit in front of it is recorded.

12. The machining center as claimed in claim 1, wherein the positioning apparatus is designed such that it holds a tool unit to be illuminated by way of the illumination apparatus in position in front of the image sensor such that the image sensor is partially shaded by the tool unit.

13. The machining center as claimed in claim 12, wherein extent or length of the shaded area is to be determined with an accuracy of at least 0.5 mm, in particular at least 0.25 mm, ideally of at least 0.1 mm.

14. A method for creating a digital twin of a tool unit consisting of a tool holder and a tool insert, wherein the tool unit is positioned in front of an image sensor that is divided into individual pixels for which it is output whether the pixel in question is illuminated or underilluminated, and in that the tool unit is illuminated with at least one beam consisting of directed light that is either reflected from the tool unit or impinges on the image sensor, and in that the enveloping contour of the tool unit is calculated from the pixels that are wholly or partly shaded by the tool unit and are therefore underilluminated and the envelope contour of the tool unit is used for making the digital twin or the digital image of the tool unit in order to simulate a machining process with the digital twin or the digital image, so that collision monitoring can be carried out, and the cutting edge areas of the tool are disregarded to determine a collision-relevant envelope contour from the envelope contour.

15. The method as claimed in claim 14, wherein the tool unit is set in rotation during the measurement.

16. The method as claimed in claim 15, wherein the rotational speed is high enough that a shadow is cast, which is able to be recognized as a shadow that is cast with stationary lines.

17. The method as claimed in claim 16, wherein, due to the rotation, all of the pixels that lie at least temporarily in the area of the shadow that is cast deliver only an average signal strength that is far enough from the signal strength of a 100%-illuminated pixel that the pixel in question is recognized as shaded, in particular when its average signal strength is at most 75% of a pixel.

18. A method for creating a digital twin of a tool unit consisting of a tool holder and a tool insert wherein the preferably rotating tool unit is positioned in front of a measuring grid and a digital image of the measuring grid with the tool unit in front of it is then recorded and the length of the measuring lines crossing in two spatial directions—which are preferably orthogonal—is then determined, wherein, for measuring lines whose length is shorter than that of an undisturbed continuous measuring line in the same direction, the position at which the measuring line ends is determined and the enveloping contour and thus the image of the tool unit is calculated from the end points thereby obtained—preferably by interpolation between immediately adjacent end points, and in that the envelope contour of the tool unit is used for making the digital twin or the digital image of the tool unit in order to simulate a machining process with the digital twin or the digital image, so that collision monitoring can be carried out, and the cutting edge areas of the tool are disregarded to determine a collision-relevant envelope contour from the envelope contour.

19. A device for performing a method as claimed in claim 14.

20. The use of the shadow that is cast by a rotating tool unit on an image sensor that delivers an electronic light/dark signal in order to determine the enveloping contour of the tool unit within the scope of a computational collision check along a predetermined machining path and through a workpiece to be cut, wherein the tool unit is a complete tool unit comprising a tool and a tool holder, and the cutting edge areas of the tool are disregarded to determine a collision-relevant envelope contour from the envelope contour.

* * * * *